United States Patent [19]

Hitchcock et al.

[11] Patent Number: 5,418,703
[45] Date of Patent: May 23, 1995

[54] DC-DC CONVERTER WITH RESET CONTROL FOR ENHANCED ZERO-VOLT SWITCHING

[75] Inventors: Leonard J. Hitchcock, Montrose, Pa.; Ronnie A. Wunderlich, Endicott, N.Y.

[73] Assignee: International Business Machines Corp., Armonk, N.Y.

[21] Appl. No.: 114,818

[22] Filed: Aug. 31, 1993

[51] Int. Cl.⁶ .......................................... H02M 3/335
[52] U.S. Cl. ................................................ 363/17
[58] Field of Search ................... 363/17, 19, 23, 25, 363/75, 82, 91, 92, 93, 98, 133, 134

[56] References Cited

U.S. PATENT DOCUMENTS

| | | | |
|---|---|---|---|
| 4,451,876 | 5/1984 | Ogata | 363/21 |
| 4,462,069 | 7/1984 | Becky | 363/23 |
| 4,553,199 | 11/1985 | Harada et al. | 363/75 |
| 4,583,156 | 4/1986 | Forge | 363/17 |
| 4,661,898 | 4/1987 | Hase | 363/82 |
| 4,811,187 | 3/1989 | Nakajima | 363/25 |
| 4,858,096 | 8/1989 | Onda et al. | 363/22 |
| 4,860,184 | 8/1989 | Tabiaz et al. | 363/17 |
| 4,860,185 | 8/1989 | Brewer et al. | 363/41 |
| 4,860,189 | 8/1989 | Hitchcock | 363/132 |
| 4,931,918 | 6/1990 | Inou et al. | 363/19 |
| 5,132,889 | 7/1992 | Hitchcock et al. | 363/17 |
| 5,157,592 | 10/1992 | Walters | 363/17 |

*Primary Examiner*—Thomas M. Dougherty
*Assistant Examiner*—E To
*Attorney, Agent, or Firm*—Eugene I. Shkurko; William H. Steinberg

[57] ABSTRACT

A circuit for producing one or more regulated auxiliary voltages from a single zero-volt full bridge power stage without degrading the zero-volt switching action. The freewheeling diode used in previous magnetic amplifiers is no longer needed. Transformer current is carried to an auxiliary output inductor through a gate winding of a saturable reactor while a second saturable reactor is reset. Current from the output inductor normally diverted through the freewheeling diode is provided to the transformer through the first saturable reactor just before the transformer provides a pulse of opposite polarity thus discharging the capacitance of the primary switches and enhancing the full bridge zero-volt switching process.

5 Claims, 3 Drawing Sheets

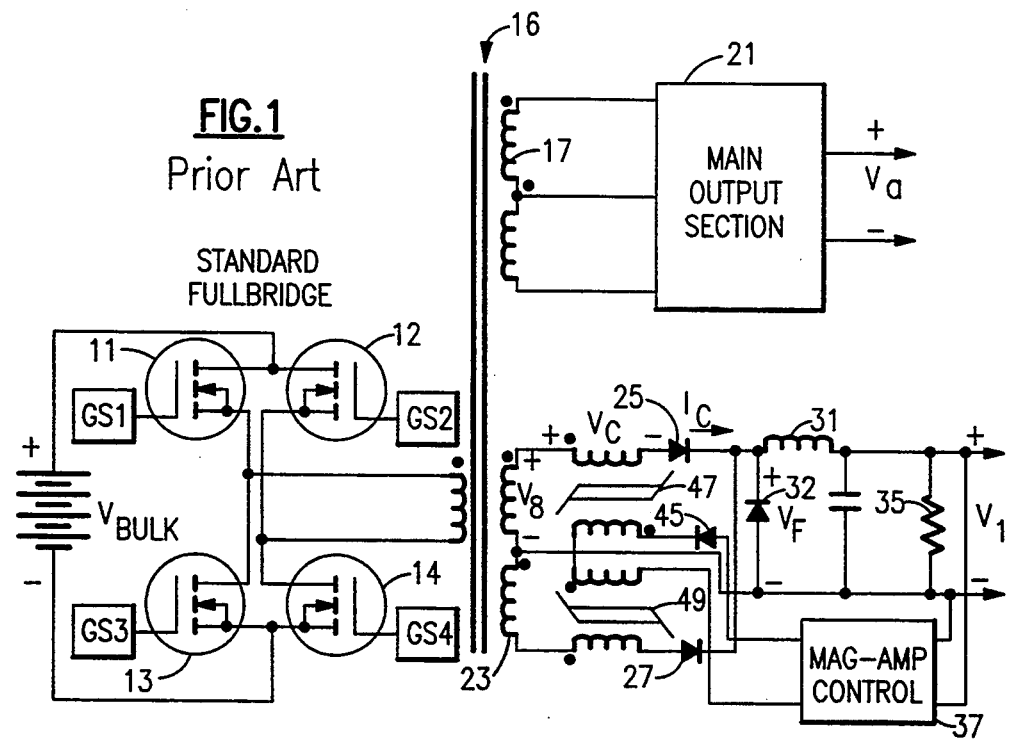
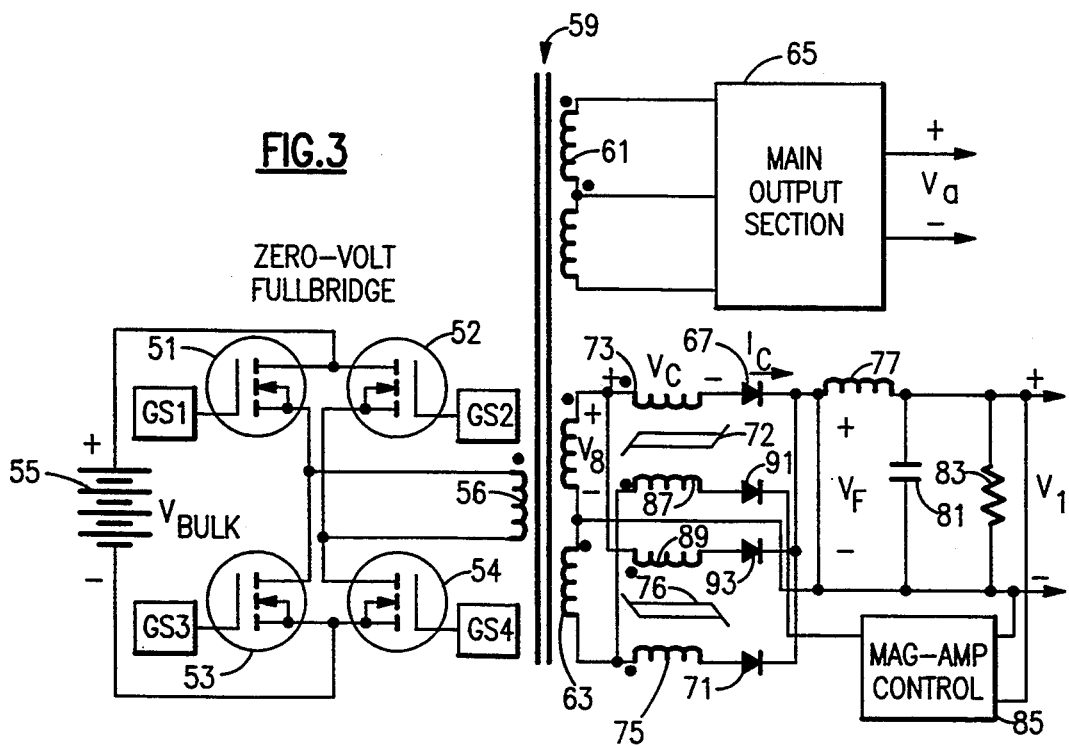

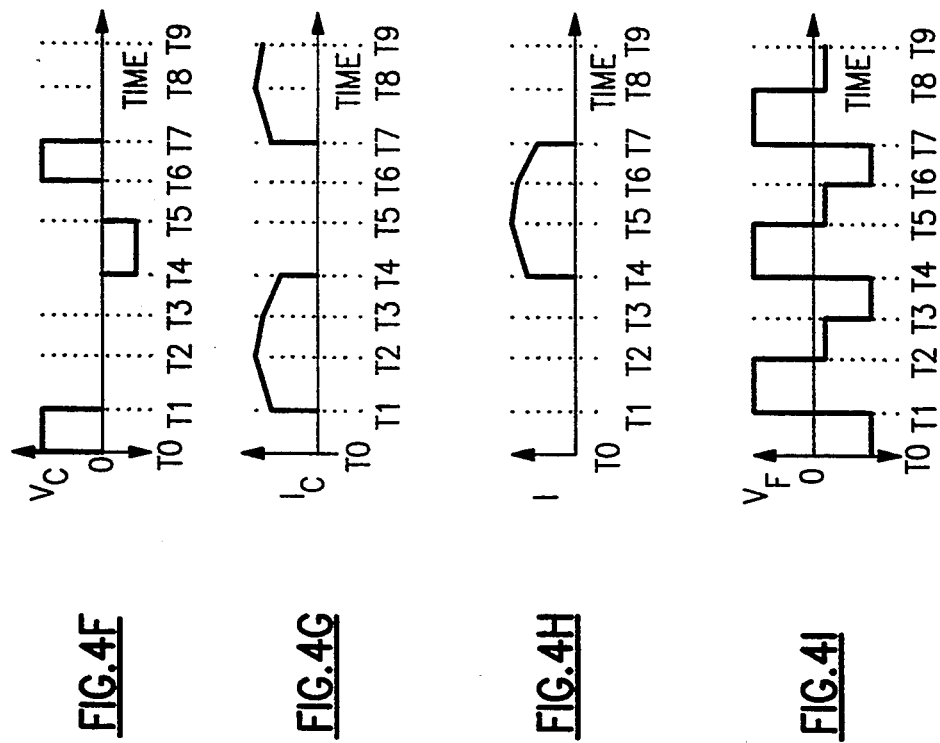
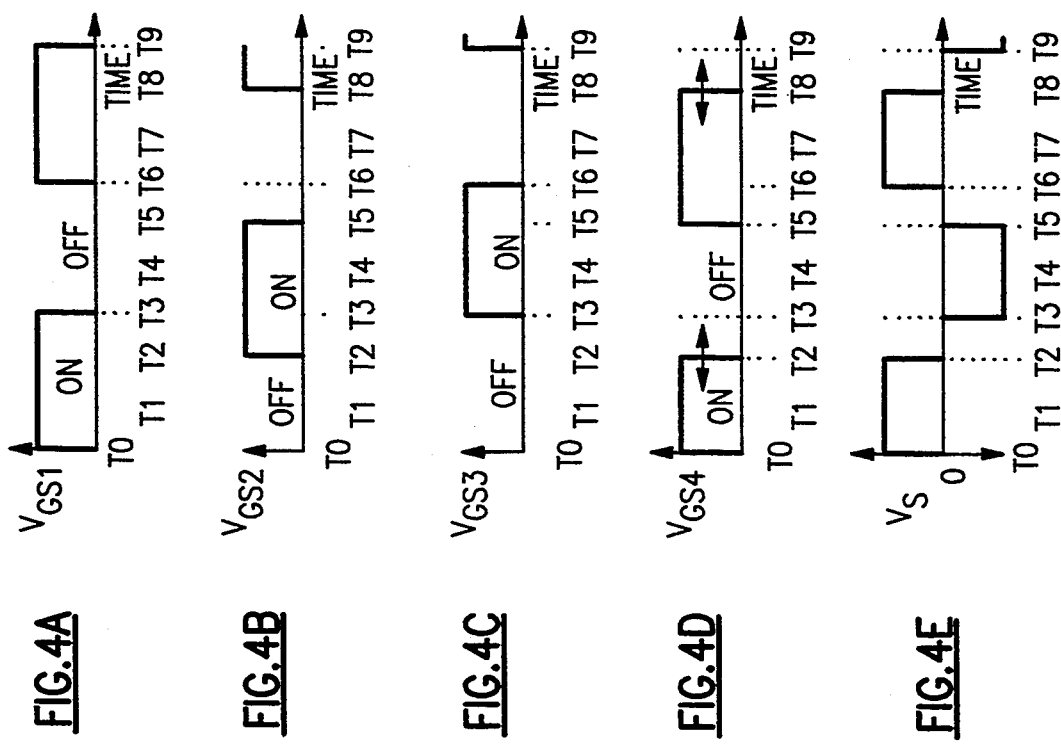
FIG.4A FIG.4B FIG.4C FIG.4D FIG.4E FIG.4F FIG.4G FIG.4H FIG.4I

DC-DC CONVERTER WITH RESET CONTROL FOR ENHANCED ZERO-VOLT SWITCHING

This invention relates to DC to DC power supply design and more particularly to zero-volt switching full bridge and magnetic amplifier controlled auxiliary outputs.

BACKGROUND OF THE INVENTION

The power converter portion of modern electronic equipment tends to be bulky and is often the limiting factor when attempting to miniaturize. In reducing power converter size, designers have turned to increased switching frequencies. Higher frequencies allow for smaller lighter inductive and capacitive energy storage devices, but also bring with them increased switching power losses.

The power dissipation of DC-DC power converters can be reduced by using zero-voltage switching (ZVS) techniques. Zero-voltage switching occurs when a power device begins conduction with a near zero-voltage across the device. Achieving zero-voltage switching over a large range of line voltages and loads is desirable to reduce electromagnetic interference. A practical example of zero-voltage switching occurs in the power devices of a phase-shifted full bridge converter under certain conditions.

U.S. Pat. No. 4,811,187, issued Mar. 7, 1989 to Nakajima et al discloses a magnetic-amplifier control scheme for a standard full bridge and is shown in FIG. 1. However, the magnetic-amplifier control will not work with a zero-volt switching full bridge, such as the ones shown in U.S. Pat. Nos. 4,860,189 and 5,132,889, both of which are hereby incorporated by reference. FIG. 2 shows the timing chart associated with FIG. 1 for operating the magnetic-amplifier control with a standard full bridge. Standard full bridge switching is controlled to achieve the desired output voltage $V_0$.

In a standard full bridge with magnetic amplifier control, the saturable reactors are used to block a portion of the primary on-time resulting in a decrease of duty cycle to separately control the output $V_1$. This decrease in duty cycle is shown in FIG. 2, between the time T0 and T1, where $V_C$ is the blocking voltage of the saturable reactor. The change in duty cycle can be seen by comparing $V_S$ with $V_F$, where $V_S$ is the voltage induced in the secondary winding and $V_F$ is the voltage applied to the output inductor, between time T0 and T2. However, a freewheeling diode 32 is needed to provide an alternate path for output inductor current 31 during the time the primary 15 is not conducting current. It is not possible to have both forward diodes 25 and 27 conduct one-half of the inductor current as the main winding does, since one of the cores of the saturable reactors 47 or 49 was reset during the previous on-time and must block following this off-time. This results in the secondary current dropping to zero amperes and therefore no primary current will flow during the freewheeling interval of T2 through T4.

In a ZVS full bridge, it is necessary to have the primary current flowing during the primary clamped interval as disclosed, for example, in U.S. Pat. No. 5,132,889. Previous magnetic amplifiers do not allow the forward diodes and their corresponding saturable reactor to conduct until after the blocking interval. It would be advantageous for the forward diode to conduct as above and to also force the diode to continue conducting during both the primary clamped interval and during the first part of the next primary "on-time" while the opposite saturable reactor is blocking. It would be advantageous to have the zero-volt switching action to be improved or at least unaffected with a magnetic amplifier used on an auxiliary output.

It is an object of the present invention to provide one or more regulated auxiliary voltages from a single zero-volt full bridge power stage without degrading the zero-volt switching action.

It is a further object of the present invention to provide one or more regulated auxiliary voltages from a single zero-volt full bridge power stage without using a freewheeling diode in the output stage.

SUMMARY OF THE INVENTION

In one aspect of the present invention a DC to DC converter with separately regulated outputs is provided. A zero voltage switching full bridge supplies alternating voltage pulses of opposite polarities spaced from one another by a controlled time duration. A transformer with a primary winding and a first and second secondary winding is provided, with the primary winding connected to the output of the full bridge. The primary winding is periodically clamped by said full bridge between pulses of opposite polarities. A first output means is connected to the first secondary winding for providing a first output voltage controlled by the switching of the full bridge. A second output means is coupled to the second secondary winding and includes a magnetic amplifier. The magnetic amplifier has an inductor, first and second diodes, and first and second saturable reactors, with each saturable reactor including a gate winding. The first end of the gate windings of the first and second saturable reactors is connected to either end of the second secondary winding, the other end of the gate windings of the first and second saturable reactors is connected through the first and second diodes to one end of the inductor. The output voltage of the magnetic amplifier is available between the other end of the inductor and an intermediate tap of the second secondary winding. The magnetic amplifier further includes reset control means for resetting the first and second saturable reactors in response to the output voltage, so that a path for flyback current from the inductor is provided through one of the gate windings, one of the diodes, the second secondary winding, and the intermediate tap during the controlled time durations, thereby permitting zero volt switching action in the full bridge.

In another aspect of the present invention a method of operating a magnetic amplifier with saturable reactors to provide a regulated auxiliary output voltage for a zero volt switching bridge coupled to the bridge through a transformer is provided. Current from the transformer is carried to an auxiliary output inductor through a gate winding of a first saturable reactor after the transformer receives a first polarity pulse and the first saturable core saturates. The second saturable core is reset while the gate winding of the first saturable core is carrying current to the inductor from the transformer. The amount of core reset is responsive to the auxiliary output. Current from the output inductor is provided through a gate winding of a first saturable reactor to the transformer after the first polarity pulse ceases and before a pulse of opposite polarity is provided by the transformer. Current from the transformer is carried to the auxiliary output inductor through a gate winding of the second saturable reactor after the transformer receives a second polarity pulse and the second saturable core saturates. The first saturable core's reset is responsive to the auxiliary output, while the second saturable gate winding is carrying current from the transformer to the inductor. Current from the output inductor is provided through a gate winding of the second saturable reactor to the transformer after the second polarity pulse ceases and before a pulse of the first polarity is provided by the transformer.

BRIEF DESCRIPTION OF THE DRAWING

FIG. 1 is a schematic overview of a prior art standard full bridge with a magnetic amplifier controlled output.

FIG. 4G shows the current $I_C$, through the gate winding of the saturable reactor 47, and FIG. 4H shows the voltage $V_F$ supplied to the output inductor 31.

FIG. 3 is a schematic representation a magnetic amplifier for zero-volt switching.

FIGS. 4A–I show the resulting waveforms for the preferred embodiment, on a common time scale, FIGS. 4A–D show the gate pulses for transistors 51–54, respectively, FIG. 4E shows the secondary voltage Vs, FIG. 4F shows the voltage across the saturable reactor gate winding $V_C$, FIG. 4G shows the current $I_C$, through the gate winding of the saturable reactor 73, and FIG. 4H shows the voltage $V_F$ supplied to the output inductor 77.

DETAILED DESCRIPTION OF THE INVENTION

Figure 2A:
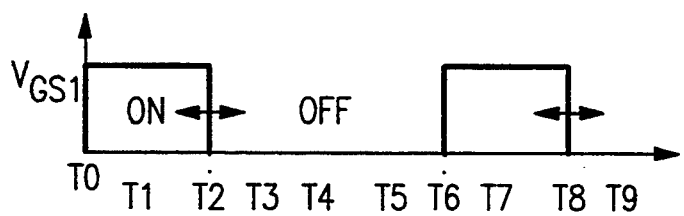
FIGS. 2A–H show the resulting waveforms for the prior art circuit of FIG. 1 on a common time scale, with FIGS. 4A–D showing the gate pulses for transistors 11–14, respectively, FIG. 4E showing the secondary voltage $V_S$, FIG. F showing the voltage $V_C$ across the saturable reactor gate winding.
Figure 2B:
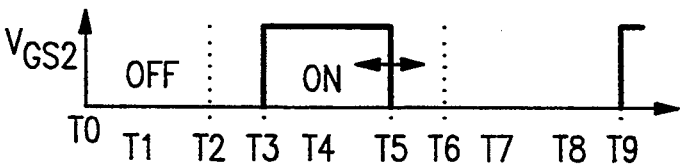
Figure 2C:
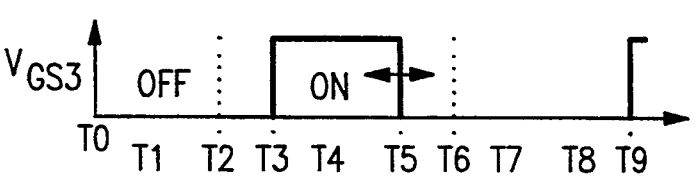
Figure 2D:
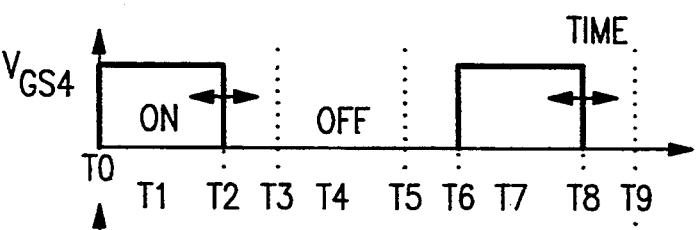
Figure 2E:
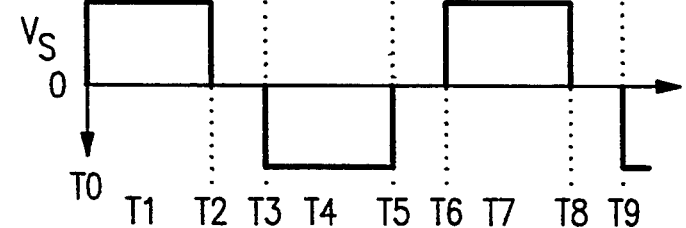
Figure 2F:
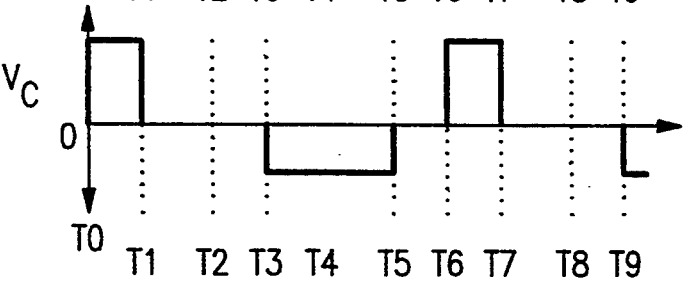
Figure 2G:
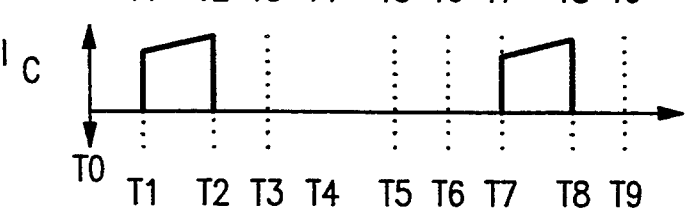
Figure 2H:
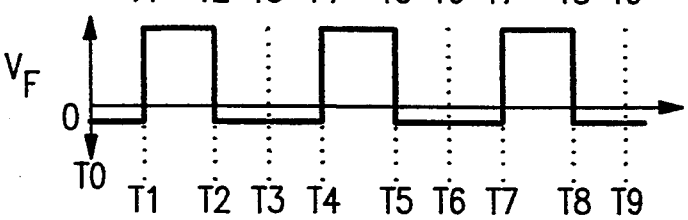

Zero-voltage switching is desirable because, as the switching frequency increases, switching losses increase proportionally in the primary switches of the standard full bridge. Zero-voltage switching eliminates these losses at turn-on which allows a higher switching frequency to be used. With zero-volt switching, there is less electromagnetic interference (EMI) generated since, the switches are already at zero volts when they turn on.

Referring now to FIG. 3, a power stage comprising a zero-volt switching phase-shifted full bridge is shown. MOSFET switches 51 and 53 are connected in series between the rails of the DC power source 55 and in parallel with series connected MOSFET 52 and 54, which are also connected between the rails of the DC power source. In one method of zero-voltage switching, MOSFET switches 51, 52, 53, and 54 operate at a fixed frequency, and the on-time of diagonally conducting power devices (transistors 11 and 14 and transistors 12 and 13) is not varied as in a pwm bridge, but rather the power devices in each leg (one leg having transistors 51 and 53, and the other leg having transistors 52 and 54) are made to alternately conduct at a duty cycle of approaching 50%. Alternatively, zero-voltage switching techniques are shown in U.S. Pat. Nos. 4,860,189 and 5,132,889. Different zero-voltage switching full bridge techniques all provide for periodically clamping the output of the full bridge to permit circulating currents to flow in the full bridge, which in turn allows the transfer of charge in the parasitic capacitances of the switching devices which allows zero-voltge switching when the devices are turned on. The phase-shift between the operation of the devices in each of the legs determines when diagonal switches are conducting at the same time and therefore supplying power to a load. By varying the phase-shift, the resulting output voltage can be pulse width modulated. The primary 56 of transformer 59 is connected between the junction of transistors 51 and 53, and the junction of transistors 52 and 54. The transformer 59 is shown with two center tapped secondary windings 61 and 63. Secondary winding 61 has a main output section 65 which can be of the type shown in U.S. Pat. No. 5,157,592. Secondary winding 63 supplies an auxiliary circuit which provides a regulated output. The auxiliary circuit includes a full wave center tapped secondary rectifier with diodes 67 and 71 having their anodes connected through a respective one of saturable reactors 72 and 76, to opposite ends of the secondary winding 63. The cathodes of the diodes 67 and 71 are connected together. The dotted end of secondary winding 63 is connected to the dotted end of saturable reactor gate winding 73. The dot convention is used to indicate the relative polarity of coils, such as between the primary and secondary windings and between saturable reactor gate windings and control windings at any particular instant, with the dotted ends of the coils having the same relative polarity. The dotted end of saturable reactor gate winding 75 is connected to one end of secondary winding 63. The anodes of diodes 67 and 71 are connected through output inductor 77 to the positive DC output of the auxiliary circuit. The center tapped connection of the secondary coil 63 provides the negative DC output of the auxiliary circuit. Connected in parallel between the positive and negative DC output terminals of the auxiliary circuit are an output capacitor 81 and a bleed resistor 83 in parallel with one another. A magnetic amplifier control 85 receives as an input signal, the output voltage of the auxiliary circuit $V_1$ and controls a reset current through control windings 87 and 89 associated with saturable reactors 72 and 76, respectively. The dotted end of control winding 87 for saturable reactor 72 is connected to the dotted end of saturable reactor gate winding 75. The other end of the control winding 87 is connected to the anode of a diode 91. The cathode of diode 91 is connected to the magnetic amplifier control 85. Control winding 89 for saturable reactor 76 has its dotted end connected to the dotted end of saturable reactor gate winding 73. The other end of control winding 89 is connected to the anode of a diode 93. The cathode of diode 93 is connected to the cathode of diode 91.

The transformer primary current flowing at turn-off of one transistor of the zero volt full bridge charges the parasitic capacitances of that transistor while reducing the charge on the parasitic capacitances of the other transistor in the same leg, thereby reducing the voltage across the other transistor, which is also the next transistor to be turned on. As a condition of zero-voltage switching the turn-on of the transistor in the same leg with the transistor that was just turned off, must be delayed, until the voltage across the transistor has been reduced to near zero. For a pair of transistors in the same leg, the time required to charge the capacitances of the transistor being turned off and discharge the transistor to be turned on, is inversely proportional to the square of the magnitude of current established before the switching interval. Magnetic amplifier control 85 is a control loop to vary the reset current of the saturable reactors to provide a regulated output voltage.

FIG. 4 shows the timing waveforms for the preferred embodiment. Waveforms $V_{GS1}$ through $V_{GS4}$ shows the timing waveforms for the Power MOSFET devices used to achieve one method of zero-volt switching as set forth in U.S. Pat. No. 5,132,889.

At the beginning of period T0 through T1, the saturable reactor 47 is in a blocking state. The blocking characteristics of the saturable reactors are controlled by the magnetic amplifier which applies the reset current and voltage, during the off time of each diode. By varying the reset-volt time, the resulting voltage applied at output inductor 31 (shown as $V_F$) between T0 and T2 changes. The time interval between T2 and T3 is the primary clamped mode, with the output inductor 31 supplying the energy. This current ($I_C$) will continue to flow through the diode 25 with saturable reactor 47 saturated, since saturable reactor 49 is in a blocking state. The secondary voltage ($V_S$) is approximately zero volts during this time interval. At the beginning of the next primary "on-time" (T3 to T4), $V_S$ is negative with saturable reactor 49 in a blocking state and the current $I_C$ continues to flow through diode 25. The time interval between T4 and T5 shows saturable reactor 49 has saturated and saturable reactor 47 is being reset. With saturable reactor 47 out of saturation, $I_C$ is down to zero amperes. The reverse volt-time provided by the reset current in the control windings is applied to saturable reactor 47 while saturable reactor 49 is saturated during the turn-on interval (T4 to T5). With conventional magnetic amplifiers a third freewheeling diode is necessary to assure each diode has an off time to allow its core to remain reset. However, with the zero-volt phase-shift switching technique (see for example, U.S. Pat. Nos. 4,860,189 and 5,132,889) the diode 25 that was conducting during the secondary "on-time" (T1 to T2) must continue to conduct all of the current during the primary clamped interval (T2 to T3). This allows the output inductor current to provide energy to the primary circuit capacitance during each resonant transition interval which is necessary for zero-volt switching over the widest line and load conditions. Since saturable reactor 47 was being reset during the time T1 to T2, it will block during the primary clamped interval T2 to T3. Since the secondary is at zero volts, saturable reactor 47 blocks at nearly zero volts which is easily done without a freewheeling diode. Most of the blocking volt-time for saturable reactor 49 occurs from T3 to T4 to alter the voltage, $V_F$. If, as with conventional magnetic amplifiers, a third freewheeling diode were used, the output inductor current would be diverted through it and the current wouldn't be available to discharge the capacitance of the primary switches to zero volts prior to their being turned on. There is a phase-shift of the diode current (secondary current) with respect to the secondary voltage and each diode conducts 50% of the time. The magnetic amplifier, as described above, and shown in FIG. 3, now can be used with a zero-volt phase-shifted full bridge and its current is now available to enhance the zero-volt switching process while eliminating the third output diode.

Shown is one way to control the blocking state of the saturable reactors to achieve the desired waveforms. Other ways of accomplishing this both with and without an external winding on the saturable reactors will be obvious to those skilled in the art.

The foregoing has described a DC to DC converter with one or more regulated auxiliary voltages from a single zero-volt full bridge power stage which does not degrade the zero-volt switching action and which does not use a freewheeling diode in the output stage.

While the invention has been particularly shown and described with reference to a preferred embodiment thereof, it will be understood by those skilled in the art that various changes in form and details may be made therein without departing from the spirit and scope of the invention.

What is claimed is:

1. A DC to DC converter with separately regulated outputs comprising:
    a zero voltage switching full bridge, for providing alternating voltage pulses of opposite polarities spaced from one another by a controlled time duration;
    a transformer having a primary winding and a first and second secondary windings, said primary winding connected to the output of said full bridge, said primary winding being periodically clamped by said full bridge between said alternating voltage pulses;
    first output means connected to said first secondary winding for providing a first output voltage controlled by the switching of said full bridge;
    second output means coupled to said second secondary winding including a magnetic amplifier, said amplifier having an inductor, first, second, third, and fourth diodes, first and second saturable reactors, each of said saturable reactors including a gate winding and a control winding, a first end of the gate windings of said first and second saturable reactors connected to either end of said second secondary winding, the other end of the gate windings of said first and second saturable reactors connected through the first and second diodes to one end of said inductor, a first end of the control windings of said first and second saturable reactors connected to either end of said second secondary winding, the other end of the control windings of said first and second saturable reactors connected through the third and fourth diodes to a magnetic amplifier reset control means, the output voltage of the magnetic amplifier available between the other end of said inductor and an intermediate tap of said second secondary winding, said magnetic amplifier reset control means for resetting said first and second saturable reactors responsive to said output voltage, thereby permitting zero volt switching action in said full bridge.

2. The DC to DC converter of claim 1, further comprising an output capacitor connected across the second output and a bleed resistor connected in parallel with said capacitor.

3. The DC to DC convertor of claim 1, wherein said reset control means comprises control windings associated with each of said saturable reactors for resetting said saturable reactors.

4. A method of operating a magnetic amplifier with saturable reactors to provide a regulated auxiliary output voltage for a zero volt switching bridge coupled to said magnetic amplifier through a transformer, comprising the steps of:
    a) carrying current from the transformer to an auxiliary output inductor through a gate winding of a first saturable reactor after said transformer receives a first polarity pulse and said first saturable core saturates;

b) resetting a second saturable core responsive to the auxiliary output voltage;

c) providing current from the output inductor only through the gate winding of the first saturable reactor to the transformer after said first polarity pulse ceases and before a pulse of opposite polarity is provided by said transformer, said current from the output inductor discharging the capacitance of primary switches of the zero volt switching bridge;

d) carrying current from the transformer to the auxiliary output inductor through a gate winding of said second saturable reactor after said transformer receives a second polarity pulse and said second saturable core saturates;

e) resetting the first saturable core responsive to the auxiliary output; and f) providing current from the output inductor only through the gate winding of the second saturable reactor to the transformer after said second polarity pulse ceases and before a pulse of the first polarity is provided by said transformer, said current from the output inductor discharging the capacitance of primary switches of the zero volt switching bridge.

5. The method of claim 4 further comprising the step of continuing to carry current through the gate winding of said first saturable reactor to the transformer from said inductor, when said pulse of opposite polarity begins, until said second saturable reactor core saturates; said step occurring after step c), and further comprising the step of continuing to carry current through the gate winding of said second saturable reactor to the transformer from said inductor when said pulse of the first polarity begins, until said first saturable reactor core saturates; said step occurring after step f.

* * * * *